United States Patent [19]
Danielson et al.

[11] 3,948,334
[45] Apr. 6, 1976

[54] TANDEM REAR SUSPENSION FOR A MOTOR VEHICLE

[75] Inventors: Charles R. Danielson, La Porte, Ind.; Ernest Schoenberger, Dearborn Heights, Mich.

[73] Assignee: Ford Motor Company, Dearborn, Mich.

[22] Filed: Nov. 4, 1974

[21] Appl. No.: 520,699

[52] U.S. Cl. ..... 180/24.13; 280/104.5 R; 280/124 F
[51] Int. Cl.² .......................................... B62D 61/00
[58] Field of Search 280/104.5 R, 104.5 A, 104.5 B, 280/124 F; 180/22, 24.02, 24.13

[56] References Cited
UNITED STATES PATENTS

| | | | |
|---|---|---|---|
| 2,386,988 | 10/1945 | Sullivan | 280/104.5 R |
| 2,750,201 | 6/1956 | Hagedorn | 280/104.5 R |
| 3,154,324 | 10/1964 | Symes | 280/124 F |
| 3,157,238 | 11/1964 | Kraemer et al. | 280/104.5 R |
| 3,224,522 | 12/1965 | Fleming | 280/104.5 R |
| 3,295,623 | 1/1967 | Kyzer | 280/104.5 R |
| 3,313,369 | 4/1967 | Whitehead | 280/104.5 R |
| 3,617,072 | 11/1971 | Turner, Jr. | 280/124 F |
| 3,762,487 | 10/1975 | Bilas | 280/104.5 R |
| 3,782,753 | 1/1974 | Sweet et al. | 280/124 F |
| 3,784,221 | 1/1974 | Frasier, Sr. | 280/124 F |

*Primary Examiner*—M. H. Wood, Jr.
*Assistant Examiner*—Jack D. Rubenstein
*Attorney, Agent, or Firm*—Clifford L. Sadler; Keith L. Zerschling

[57] ABSTRACT

The present disclosure relates to a tandem rear suspension for a motor vehicle having a forward driving axle and a rearward dead axle. Left and right leaf springs are pivotally connected to the vehicle frame and have their forward and rearward ends pivotally connected to the forward and rearward axles, respectively. Forward and rearward pairs of suspension arms interconnect the forward and rearward axles with the vehicle frame. The arms of each pair extend forwardly and inwardly. A stabilizer bar is interposed between the rear dead axle and the vehicle frame. Pneumatic springs are interposed between the forward axle and the frame to provide a means for controlling vehicle height. The suspension is particularly well adapted to a commercial vehicle chassis such as used in motor homes and buses where ride and handling are important considerations.

1 Claim, 5 Drawing Figures

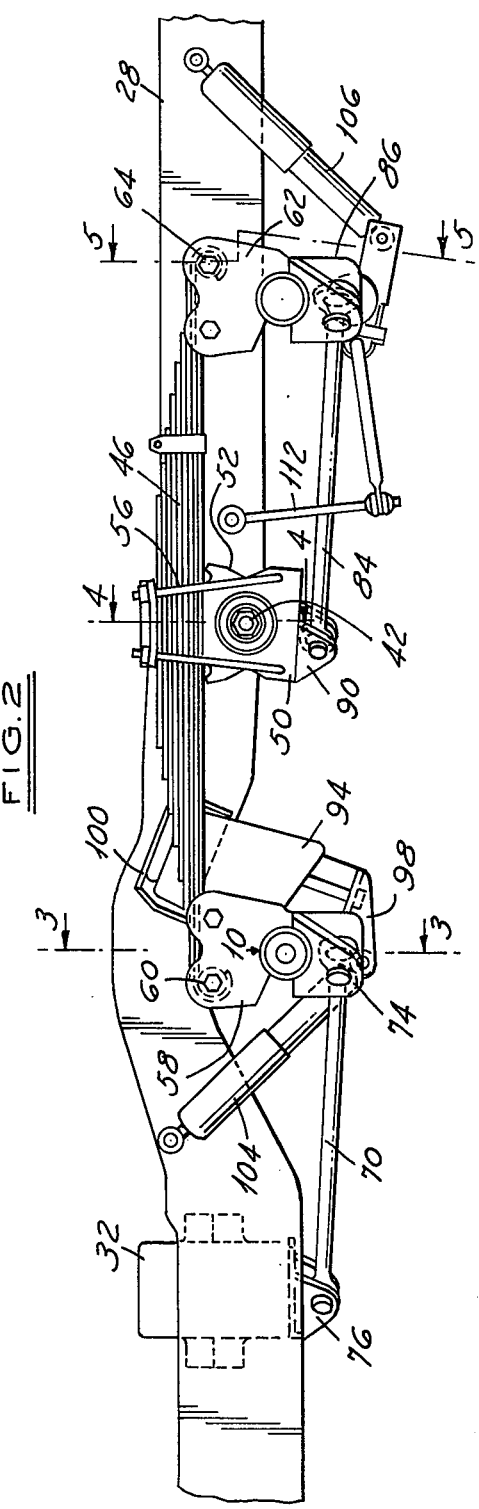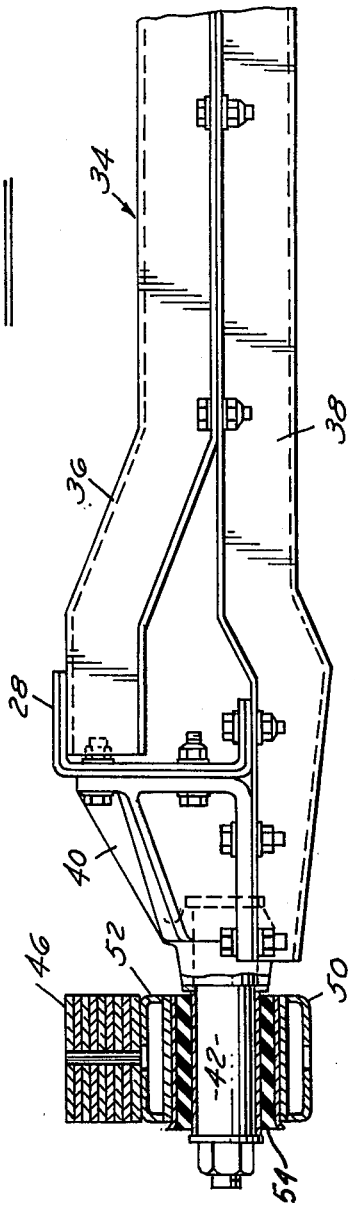

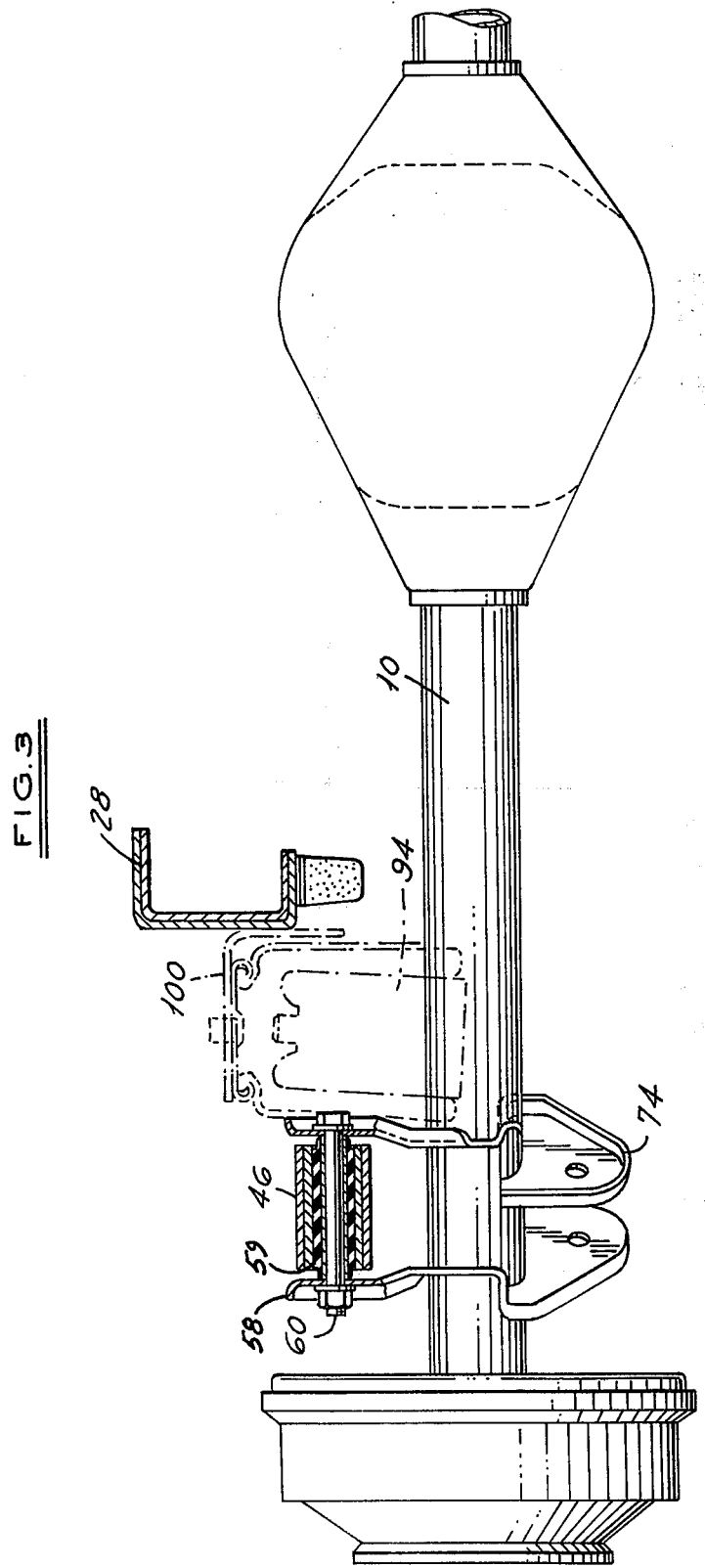

TANDEM REAR SUSPENSION FOR A MOTOR VEHICLE

BACKGROUND OF THE DISCLOSURE

The conventional motor home or bus uses a truck chassis and its heavy truck suspension. The running gear of such a chassis is designed for the principal purpose of supporting a maximum vehicle load. Sometimes such heavy duty truck chassis do not provide the ride and handling characteristics that are desirable for a passenger carrying vehicle where the loads are only moderate.

It is the principal object of the present invention, therefore, to provide a tandem suspension for a commercial vehicle that is characterized by its superior ride and handling properties.

BRIEF SUMMARY OF THE DISCLOSURE

In the presently preferred embodiment of this invention, a tandem rear suspension has a forward live axle and a rearward dead axle. Left and right leaf springs have their midportions pivotally connected to the vehicle frame and their forward and rearward ends pivotally connected to the forward and rearward axles, respectively. A forward pair of suspension arms connect the forward axle to the frame. A rearward pair of suspension arms connect the rearward axle to the frame. The suspension arms of both pairs extend forwardly and inwardly.

A pair of air suspension springs are interposed between the forward axle and the frame. A pressure source and control means are provided in association with the air springs to permit inflating the springs to a desired pressure for the purpose of regulating the height of the frame above the axles.

A stabilizer bar is interposed between the rearward axle and frame to control body roll. The suspension arms may be angled upwardly or downwardly to provide the desired amount of anti-squat and anti-lift forces during acceleration and braking.

BRIEF DESCRIPTION OF THE DRAWINGS

The many objects and advantages of a motor vehicle suspension system constructed in accordance with this invention will become apparent upon consideration of the following detailed discussion and the accompanying drawings, in which:

FIG. 2 is a side elevational view of the left side of the suspension system of FIG. 1.

FIG. 3 is a sectional view, taken along section line 3—3 of FIG. 2, showing a portion of the forward axle and suspension structure.

FIG. 4 is a sectional view, taken along section line 4—4 of FIG. 2, showing a portion of the vehicle frame support for the left spring.

DETAILED DESCRIPTION OF THE PRESENTLY PREFERRED EMBODIMENT

Figure 1:
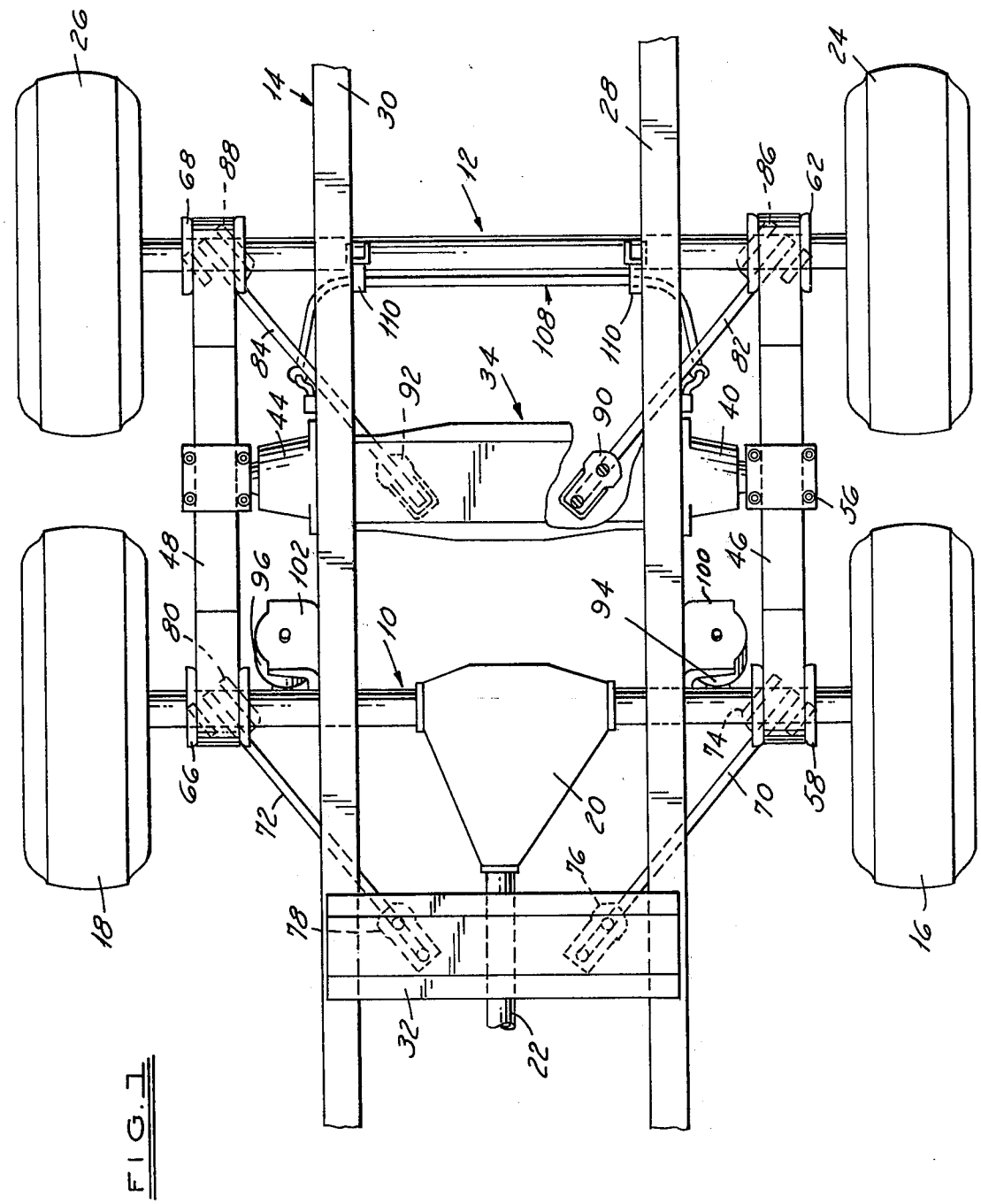
FIG. 1 is a top plan view of a tandem rear suspension system for a motor vehicle embodying the presently preferred form of the invention.
Figure 5:
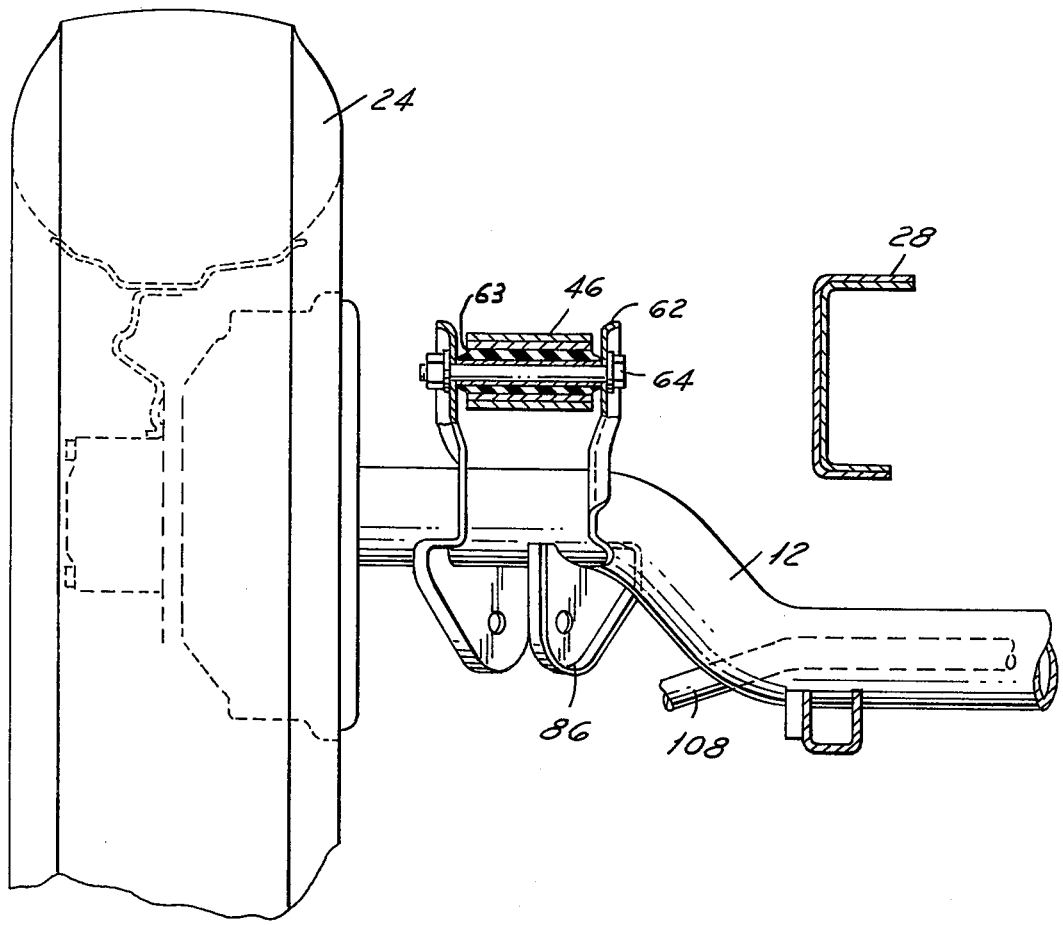
FIG. 5 is a sectional view, taken along section line 5—5 of FIG. 2, showing a portion of the rear axle and related suspension structure.

Referring now to the drawings for a more complete understanding of the present invention, FIG. 1 discloses a tandem rear suspension system for a motor vehicle. The suspension includes a forward live axle 10, a rearward dead axle 12, a vehicle frame assembly 14 and suspension means connecting the axles 10 and 12 to the frame 14.

The forward axle 10 rotatably supports left and right road wheels 16 and 18. Differential gearing is contained within a housing portion 20 of the axle 10. The gearing is coupled to an engine power plant by means of a drive shaft 22 and functions to transmit driving torque to the road wheels 16 and 18.

The rear axle 10 is a dead axle and is not connected to the vehicle engine. Left and right road wheels 24 and 26 are freely rotatable at the outer ends of the axle 12.

The frame assembly 14 includes left and right frame side rails 28 and 30. A frame cross member 32 situated forwardly of the axle 10 interconnects the rails 28 and 30. The cross member 32 supports elements of the forward portion of the suspension system as will be described. A cross member assembly 34 interconnects the rails 28 and 30 and is situated generally between the axles 10 and 12 in the plan view.

The frame subassembly 34 includes a cross member 36 that is bolted at its ends to the rails 28 and 30. A second member 38 is bolted to the first frame member 36 and has end portions that extend externally outwardly beyond the rails 28 and 30. A pivot bracket 40 is bolted to the left end of the frame member 38 and to the left rail 28. It has a laterally extending pivot shaft portion 42. A similarly constructed pivot bracket 44 is situated on the right side of the frame subassembly 34.

Left and right longitudinally extending multiple leaf springs 46 and 48 interconnect the axle 10 and 12 and are pivotally connected to the left and right frame brackets 40 and 44. The construction of the connection between the left spring 46 and the bracket 40 is shown in FIGS. 2 and 4. Lower and upper clamps 50 and 52 are positioned about a resilient bushing 54 that is supported on the spindle portion 42 of the bracket 40. Bolts 56 secure the clamps 50 and 52 to the bushing 54 and secure the springs 46 to the clamps. The right leaf spring 48 is similarly pivotally connected to the right frame bracket 44.

The forward end of the multiple leaf spring 46 is pivotally connected to an upstanding bracket 58 that is welded to the outer end of the axle 10. An eye is formed at the forward end of the spring 46 and a resilient bushing 59 is positioned in that eye. A bolt 60 extending through the bushing 59 connects the spring 46 to the bracket 58.

An upstanding bracket 62 is welded to the left outer end of the rearward dead axle 12. The rearward end of the spring 46 is provided with an eye in which a resilient bushing 63 is positioned. A pivot bolt 64 extends through the bushing 63 and secures the end of the spring 46 to the bracket 62.

A bracket 66 is welded to the right end of the axle housing 10 and a bracket 68 is welded to the right end of the rearward axle 12. The forward and rearward ends of the leaf spring 48 are pivotally connected to the brackets 66 and 68 by means of resilient bushings and pivot bolts.

Left and right suspension arms 70 and 72 interconnect the forward driving axle 10 and the frame cross member 32. As seen in FIG. 2, a bracket structure 74 depends downwardly from the axle 10 at its outer end and adjacent the bracket 58 for the leaf spring 46. A bracket 76 is welded to the frame cross member 32. The forward and rearward ends of the suspension arm 70 are provided with eyes and pivot bushings connect the ends of the arm 70 to the brackets 74 and 76. Similarly, a bracket 78 is welded to the frame cross member 32 near its right end and a bracket 80 is welded to the axle housing 10 beneath the spring bracket 66. The ends of the right suspension arm 72 are pivotally connected to the brackets 78 and 80. It will be noted that the suspension arms 70 and 72 for the forward axle 10 extend forwardly and upwardly in the plan view. They are also inclined forwardly and upwardly in the side elevational view of FIG. 2.

Left and right suspension arms 82 and 84 connect the rear axle 12 with the frame subassembly 34. Left and right brackets 86 and 88 are welded to the outer ends of the axle 12 beneath the left and right spring brackets 62 and 68, respectively. Left and right brackets 90 and 92 are welded to the underside of the frame subassembly 34. The suspension arm 82 has its ends pivotally connected to the brackets 86 and 90 and suspension arm 84 has its ends pivotally connected to the brackets 88 and 92. The arms 82 and 94 extend forwardly and inwardly as seen in FIG. 1 and forwardly and upwardly as seen in FIG. 2.

A pair of pneumatic suspension springs 94 and 96 are interposed between the forward axle 10 and the frame 14. A bracket 98 is welded to the left end of the axle housing 10 and a bracket 100 is welded to the left side rail 28. The air spring 94 is operatively interposed between the brackets 98 and 100. The right air spring 96 is similarly situated between a bracket welded to the axle 10 and a bracket 102 welded to the right frame rail 30. A regulated source of pneumatic pressure is provided in association with the air springs 94 and 96 to control their internal pressure for the purpose of maintaining the frame assembly 14 and the vehicle body supported thereon at a desired height above the ground.

Left and right telescopic shock absorbers are provided between the axle 10 and the frame assembly 14 to damp axle movement. One of these shock absorbers is indicated by reference numeral 104 in FIG. 2. This view also shows one of a pair of shock absorbers 106 which are situated in operative position between the frame assembly 14 and the rear axle 12.

A stabilizer bar 108 has a transversely extending midportion that is secured to the axle 12 by a pair of clamps 110. The bar 108 has forwardly extending ends that are coupled to the left and right frame rails 28 and 30 by means of links 112 (see FIG. 2). The stabilizer bar 108 prevents excessive body roll.

OPERATION

The tandem suspension illustrated in the drawings is particularly suitable for use where ride and handling characteristics are important. Typical applications for the suspension include buses and motor homes. Such usage encounters medium loads as distinguished from the heavy loads of cargo carrying vehicles and sufficient tractive force can be developed with a single driving axle. The second dead axle distributes the load and reduces the effects of road irregularities. The suspension arm arrangement provides desirable anti-squat and anti-lift forces during acceleration and braking when arranged at the appropriate angle in the side elevational view. The air suspension springs, in association with the multiple leaf springs, permits an effective spring rate that is low for riding comfort and provides a means for regulating the vehicle body height.

The foregoing description presents the presently preferred embodiment of the invention. Details of construction have been shown and described for purposes of illustration rather than limitation. Modifications and alterations may occur to those skilled in the art that will come within the scope and spirit of the following claims:

1. A suspension system for a motor vehicle comprising:
   a forward transversely extending rigid axle housing and a first pair of road wheels rotatably supported by said forward axle housing;
   torque transmitting means rotatably supported by said axle housing, coupled to said first pair of road wheels and constructed to transmit driving torque to said first wheels;
   a rearward dead axle and a second pair of road wheels rotatably supported by said rearward axle;
   said wheels of said second pair being mutually independently rotatable;
   a vehicle frame and suspension means operatively interconnecting said forward and rearward axles and said frame;
   said suspension means comprising left and right longitudinally extending leaf springs;
   left and right center pivot means pivotally connecting a midportion of said left leaf spring and a midportion of said right leaf spring to said frame;
   left and right forward pivot means pivotally connecting the forward ends of said left and right leaf springs to said forward axle;
   said left and right forward pivot means having left and right pivot axes that are fixed relative to said left and right forward ends of said left and right leaf springs, respectively, and relative to said forward axle housing;
   left and right rear pivot means pivotally connecting the rearward ends of said left and right leaf springs to said rearward axle;
   said left and right rear pivot means having left and right pivot axes that are fixed relative to said left and right rearward ends of said left and right leaf springs, respectively, and relative to said rearward dead axle;
   pneumatic spring means operatively interposed between said forward axle and said frame;
   said pneumatic spring means being constructed to be inflated at differing pressures to regulate the height of said vehicle frame above said forward axle;
   left and right front suspension arms having forward ends and rearward ends pivotally connected to said frame and said forward axle housing, respectively;
   said left and right front suspension arm extending forwardly and inwardly from said forward axle housing in the plan view and extending forwardly and upwardly from said forward axle housing in the side elevational view;
   left and right rear suspension arms having forward ends and rearward ends pivotally connected to said frame and said rearward axle, respectively;
   said left and right rear suspension arms extending forwardly and inwardly from said rearward axle in the plan view and extending forwardly and upwardly from said rearward axle in the side elevational view;
   an anti-roll stabilizer bar of generally U-shape having left and right outer ends coupled to one of said frame or said rearward axle and a generally transversely extending portion secured to the other of said frame or rearward axle;
said anti-roll stabilizer bar being constructed to exert a spring force resisting angular displacement of said frame about a longitudinal roll axis.

* * * * *